United States Patent
Keum et al.

(10) Patent No.: US 12,238,524 B2
(45) Date of Patent: Feb. 25, 2025

(54) ELECTRONIC DEVICE AND METHOD FOR PROVIDING SERVICE DATA BASED ON SERVICE DEPLOYMENT CASE IN WIRELESS COMMUNICATION SYSTEM

(71) Applicant: Samsung Electronics Co., Ltd., Gyeonggi-do (KR)

(72) Inventors: Jieun Keum, Gyeonggi-do (KR); Sehee Han, Gyeonggi-do (KR); Sungkyu Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 121 days.

(21) Appl. No.: 17/923,094

(22) PCT Filed: May 21, 2021

(86) PCT No.: PCT/KR2021/006360
§ 371 (c)(1),
(2) Date: Nov. 3, 2022

(87) PCT Pub. No.: WO2021/235893
PCT Pub. Date: Nov. 25, 2021

(65) Prior Publication Data
US 2023/0180007 A1    Jun. 8, 2023

(30) Foreign Application Priority Data
May 21, 2020    (KR) .................. 10-2020-0061129

(51) Int. Cl.
*H04W 12/30*    (2021.01)
*H04W 4/50*    (2018.01)
*H04W 4/80*    (2018.01)

(52) U.S. Cl.
CPC ............. *H04W 12/35* (2021.01); *H04W 4/50* (2018.02); *H04W 4/80* (2018.02)

(58) Field of Classification Search
CPC ..... H04W 12/50; H04W 12/55; H04W 12/63; H04W 12/66; H04W 4/50; H04W 4/70;
(Continued)

(56) References Cited

U.S. PATENT DOCUMENTS 8,806,199 B2    8/2014   Von Behren et al.
9,935,953 B1 *  4/2018   Costigan ............. H04L 63/0876
(Continued)

FOREIGN PATENT DOCUMENTS

KR    10-1281734    6/2013
KR    10-1461195    11/2014
(Continued)

OTHER PUBLICATIONS

European Search Report dated Aug. 16, 2023 issued in counterpart application No. 21809718.6-1218, 9 pages.
(Continued)

*Primary Examiner* — Raymond N Phan
(74) *Attorney, Agent, or Firm* — The Farrell Law Firm, P.C.

(57) ABSTRACT

According to an embodiment, a method, performed by an electronic device, of providing a ranging-based service may include: transmitting, from a service application installed in the electronic device to a framework, information related to service data, the information related to the service data including a service deployment case and information about a storage location of the service data; when the electronic device approaches a reader device, receiving first data from the reader device; setting up a secure channel with the reader device by using information stored in a common applet identified based on the first data, the common applet being installed in a secure component of the electronic device; and transmitting the service data to the reader device, based on second data received from the reader device.

15 Claims, 12 Drawing Sheets

(58) Field of Classification Search
CPC ......... H04W 4/80; H04W 8/005; H04W 8/02; H04W 8/08
See application file for complete search history.

(56) References Cited

U.S. PATENT DOCUMENTS

| | | | |
|---|---|---|---|
| 10,289,564 B2 | 5/2019 | Hatta et al. | |
| 10,486,646 B2 | 11/2019 | Ledvina et al. | |
| 2012/0159163 A1* | 6/2012 | von Behren | G06Q 20/3823 |
| | | | 713/168 |
| 2013/0340028 A1* | 12/2013 | Rajagopal | H04L 63/10 |
| | | | 726/1 |
| 2015/0134743 A1* | 5/2015 | Heo | H04W 4/80 |
| | | | 709/204 |
| 2017/0103378 A1 | 4/2017 | Pan | |
| 2018/0024915 A1* | 1/2018 | Taneja | G06F 11/3688 |
| | | | 714/38.1 |
| 2018/0152454 A1* | 5/2018 | Kwon | H04L 63/045 |
| 2019/0116619 A1* | 4/2019 | Hauck | H04L 63/0869 |
| 2020/0082370 A1 | 3/2020 | Yang et al. | |

FOREIGN PATENT DOCUMENTS

| | | |
|---|---|---|
| KR | 10-1572509 | 11/2015 |
| KR | 1020180095136 | 8/2018 |

OTHER PUBLICATIONS

International Search Report dated Aug. 31, 2021 issued in counterpart application No. PCT/KR2021/006360, 15 pages.

* cited by examiner

FIG. 8

| Parameter Name | Length (Octets) | Tag (IDs) | Description |
|---|---|---|---|
| DEVICE_ROLE | 1 | 0x00 | 0x00 : Scanner<br>0x01 : Advertiser |
| GATT SERVICE ROLE | 1 | | 0x00 : Server<br>0x01 : Client |

FIG. 9

| Parameter Name | Length | Value |
|---|---|---|
| SERVICE DEPLOYMENT CASE | 1 | 0x00 : Service Deployment Case 1: FiRa applet used to establish UWB session and support service application data |
| | | 0x01 : Service Deployment case 2-A: Application on secure component, laveraging secure ranging over UWB |
| | | 0x02 : Service Deployment case 2-B: Application on host, leveraging secure ranging over UWB |
| Location of Service data storage | 1 | In the case of Service Deployment Case 1, the value should be the AID of FiRa applet/ ADF of the service provider of the application/ Tag of the service data In the case of Deployment Case 2-A, the value should be the AID of legacy applet In the case of Deployment Case 2-B, the value should be the Application ID of the application |
| Value | 1 | The Value of Service Data |

ELECTRONIC DEVICE AND METHOD FOR PROVIDING SERVICE DATA BASED ON SERVICE DEPLOYMENT CASE IN WIRELESS COMMUNICATION SYSTEM

PRIORITY

This application is a National Phase Entry of PCT International Application No. PCT/KR2021/006360, which was filed on May 21, 2021, and claims priority to Korean Patent Application No. 10-2020-0061129, which was filed on May 21, 2020, the entire content of each of which is incorporated herein by reference.

TECHNICAL FIELD

The present disclosure relates to an electronic device and a method for the electronic device to provide a ranging-based service.

BACKGROUND ART

The Internet has evolved from a human-centered connection network, through which humans generate and consume information, to an Internet-of-Things (IoT) network that exchanges and processes information between distributed elements such as objects. Internet-of-Everything (IoE) technology in which a big data processing technology via a connection with a cloud server or the like is combined with the IoT technology has also emerged. In order to implement IoT, technical factors, such as sensing technology, wired/wireless communication, network infrastructure, service-interface technology, or security technology, are required. Research on technologies for connection between objects, such as sensor network, machine-to-machine (M2M) communication, or machine-type communication (MTC), has recently been conducted.

In an IoT environment, via collection and analysis of data generated from connected objects, an intelligent internet technology (IT) service to create new value for peoples' lives may be provided. IoT may be applied to various fields, such as smart homes, smart buildings, smart cities, smart cars or connected cars, smart grids, health care, smart home appliances, or high-tech medical services, via the convergence and combination of existing information technology (IT) and various industries.

As the development of wireless communication systems has enabled them to provide various services, there is a need for a method of effectively providing the services. For example, in medium access control (MAC), a ranging technique for measuring a distance between electronic devices by using ultra-wideband (UWB) may be used. UWB is a wireless communication technology that uses an ultra-wide frequency band of several GHz or greater in a baseband without using a radio carrier.

DESCRIPTION OF EMBODIMENTS

Technical Problem

There is a need for a method of allowing an electronic device providing a ranging-based service using ranging technology to safely communicate with another electronic device through a secure channel and quickly and efficiently exchange data.

Solution to Problem

According to an embodiment of the present disclosure, a method, performed by an electronic device, of providing a ranging-based service may include: transmitting, from a service application installed in the electronic device to a framework, information related to service data, the information related to the service data including a service deployment case and information about a storage location of the service data; when the electronic device approaches a reader device, receiving first data from the reader device; setting up a secure channel with the reader device by using information stored in a common applet identified based on the first data, the common applet being installed in a secure component of the electronic device; and transmitting the service data to the reader device through the secure channel, based on second data received from the reader device.

BRIEF DESCRIPTION OF DRAWINGS

FIG. 8 illustrates an application programming interface (API) for setting a service profile and to be transmitted from a service application to a framework, according to an embodiment.

FIG. 9 illustrates an API for notifying a service deployment method and to be transmitted from a service application to a framework, according to an embodiment.

BEST MODE

Figure 1:
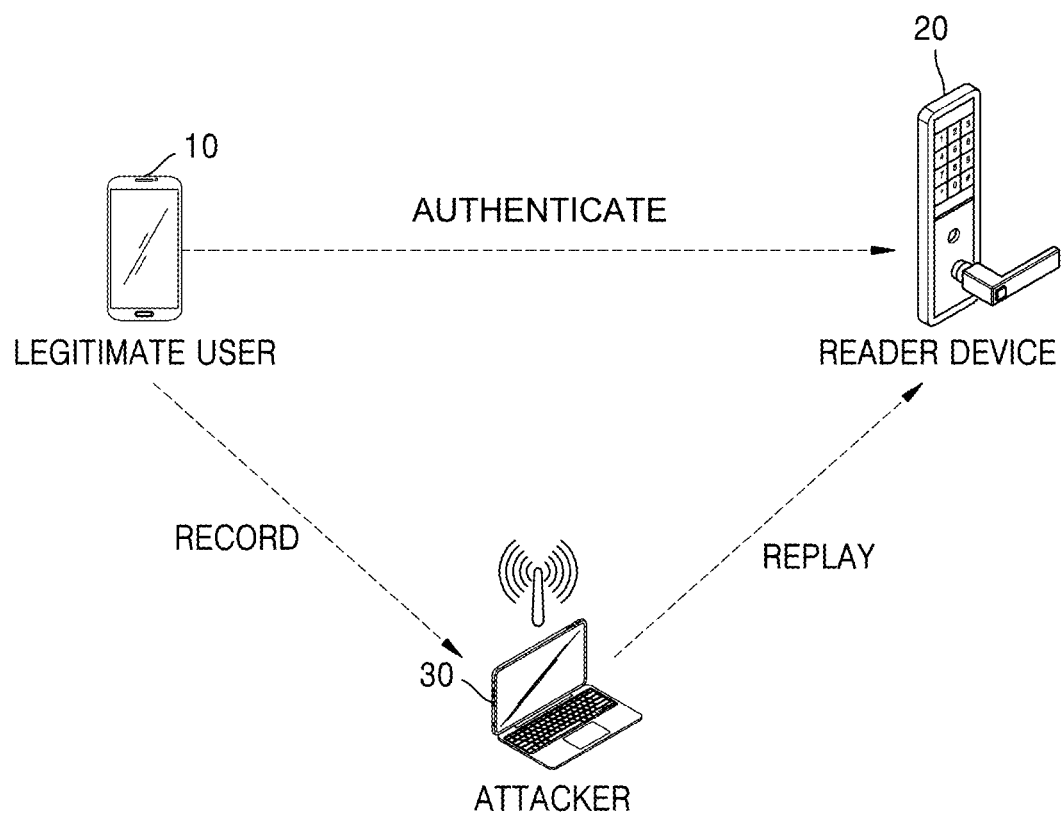
FIG. 1 illustrates a security threat that may occur in providing a general access service.

According to an aspect of the present disclosure, a method, performed by an electronic device, of providing a ranging-based service may include: transmitting, from a service application installed in the electronic device to a framework, information related to service data, the information related to the service data including a service deployment case and information about a storage location of the service data; when the electronic device approaches a reader device, receiving first data from the reader device; setting up a secure channel with the reader device by using information stored in a common applet identified based on the first data, the common applet being installed in a secure component of the electronic device; and transmitting the service data to the reader device through the secure channel, based on second data received from the reader device.

In an embodiment of the present disclosure, the service deployment case may include at least one of a first case in which the service data is stored in the common applet installed in the secure component, a second case in which the service data is stored in a legacy applet installed in the secure component, and a third case in which the service data is stored in the service application.

In an embodiment of the present disclosure, when the service deployment case is the first case, the information about the storage location of the service data may include an identifier of the common applet installed in the secure component, the first data may include an identifier of the common applet installed in the secure component, and the second data may include a tag value of the service data.

In an embodiment of the present disclosure, when the service deployment case is the second case, the information about the storage location of the service data may include an identifier of the legacy applet, the first data may include an identifier of the common applet installed in the secure component, and the second data may include an identifier of the legacy applet.

In an embodiment of the present disclosure, when the service deployment case is the third case, the information about the storage location of the service data may include an identifier of the service application, the first data may include an identifier of the common applet installed in the secure component, and the second data may include an identifier of the service application.

In an embodiment of the present disclosure, when the service deployment case is the second case, the transmitting of the service data to the reader device may include: receiving, from the reader device, a command application data unit (APDU) together with an identifier of the legacy applet; transmitting the command APDU from the framework to the legacy applet through the common applet; in response to the command APDU, transmitting a response APDU from the legacy applet to the framework through the common applet; and transmitting, to the reader device, the response APDU including the service data.

In an embodiment of the present disclosure, when the service deployment case is the third case, the transmitting of the service data to the reader device may include: receiving a command application program interface (API) from the reader device; transmitting the command API from the framework to the service application; in response to the command API, transmitting a response API from the service application to the framework; and transmitting the response API including the service data to the reader device.

In an embodiment of the present disclosure, the method may further include transmitting, from the service application to the framework, at least one of service profile configuration information and key information for setting up the secure channel.

In an embodiment of the present disclosure, the information stored in the common applet and used to set up the secure channel may include parameters used for ultra-wideband (UWB) ranging, and a session key.

In an embodiment of the present disclosure, the method may further include performing ranging by transmitting and receiving, to and from the reader device, a ranging frame including a scrambled timestamp sequence (STS) code generated by using the session key.

According to another aspect of the present disclosure, an electronic device for providing a ranging-based service may include: a communication interface configured to communicate with a reader device; a secure component configured to store information required to set up a secure channel with the reader device; and at least one processor connected to the communication interface and the secure component, and configured to execute program instructions stored in a memory to transmit, from a service application installed in the electronic device to a framework, information related to service data, the information related to the service data including a service deployment case and information about a storage location of the service data, when the electronic device approaches the reader device, control the communication interface to receive first data from the reader device, set up the secure channel with the reader device by using information stored in a common applet identified based on the first data, the common applet being installed in the secure component, and control the communication interface to transmit the service data to the reader device based on second data received from the reader device.

In an embodiment of the present disclosure, when the service deployment case is a first case in which the service data is stored in the common applet installed in the secure component, the information about the storage location of the service data may include an identifier of the common applet installed in the secure component, the first data may include an identifier of the common applet installed in the secure component, and the second data may include a tag value of the service data.

In an embodiment of the present disclosure, when the service deployment case is a second case in which the service data is stored in a legacy applet installed in the secure component, the information about the storage location of the service data may include an identifier of the legacy applet, the first data may include an identifier of the common applet installed in the secure component, and the second data may include an identifier of the legacy applet.

In an embodiment of the present disclosure, when the service deployment case is a third case in which the service data is stored in the service application, the information about the storage location of the service data may include an identifier of the service application, the first data may include an identifier of the common applet installed in the secure component, and the second data may include an identifier of the service application.

According to another aspect of the present disclosure, a computer-readable recording medium having recorded thereon a program for executing a method, performed by an electronic device, of providing a ranging-based service may be provided in which the method includes: transmitting, from a service application installed in the electronic device to a framework, information related to service data, the information related to the service data including a service deployment case and information about a storage location of the service data; when the electronic device approaches a reader device, receiving first data from the reader device; setting up a secure channel with the reader device by using information stored in a common applet identified based on the first data, the common applet being installed in a secure component of the electronic device; and transmitting the service data to the reader device through the secure channel, based on second data received from the reader device.

MODE OF DISCLOSURE

Hereinafter, embodiments of the present disclosure will be described in detail with reference to the accompanying drawings for one of skill in the art to be able to perform the present disclosure without any difficulty. The present disclosure may, however, be embodied in many different forms and should not be construed as being limited to the embodiments of the present disclosure set forth herein. In addition, in order to clearly describe the present disclosure, portions that are not relevant to the description of the present disclosure are omitted, and similar reference numerals are assigned to similar elements throughout the present specification.

Although the terms used herein are generic terms, which are currently widely used and are selected by taking into consideration functions thereof, the meanings of the terms may vary according to intentions of those skilled in the art, legal precedents, or the advent of new technology. Thus, the terms should be defined not by simple appellations thereof but based on the meanings thereof and the context of descriptions throughout the present disclosure.

In addition, terms such as "first" or "second" may be used to describe various elements, but the elements should not be limited by the terms. These terms are only used to distinguish one element from another element.

In addition, terms used herein are for describing particular embodiments and are not intended to limit the scope of the present disclosure. The singular expression also includes the plural meaning as long as it is not inconsistent with the context. In addition, throughout the specification, when a part is referred to as being "connected to" another part, it may be "directly connected to" the other part or be "electrically connected to" the other part through an intervening element. In addition, when an element is referred to as "including" a component, the element may additionally include other components rather than excluding other components as long as there is no particular opposing recitation.

As used herein, the term "the" and other demonstratives similar thereto may include a singular form and plural forms. In addition, when there is no description explicitly specifying an order of operations of a method according to the present disclosure, the operations may be performed in an appropriate order. The present disclosure is not limited to the order of the operations described.

As used herein, the term "key" refers to a digitized virtual key, and a user may control or access a device by using the key. The present disclosure relates to a method of providing a ranging-based service by using the key, and hereinafter, the term "key" may be referred to as "digital key", "smart key", or "session key".

As used herein, phrases such as "in an embodiment" does not necessarily indicate the same embodiment of the present disclosure.

An embodiment of the present disclosure may be represented by block components and various process operations. All or some of such functional blocks may be implemented by various numbers of hardware and/or software components that perform particular functions. For example, functional blocks of the present disclosure may be implemented by using one or more microprocessors, or by using circuit elements for intended functions. For example, the functional blocks of the present disclosure may be implemented by using various programming or scripting languages. The functional blocks may be implemented as an algorithm to be executed by one or more processors. In addition, the present disclosure may employ related-art techniques for electronic configuration, signal processing, and/or data processing, etc.

Also, connection lines or connection members between components illustrated in the drawings are merely illustrative of functional connections and/or physical or circuit connections. In an actual device, connections between components may be represented by various functional connections, physical connections, or circuit connections that are replaceable or added.

In general, wireless network techniques are mainly classified into wireless local area network (WLAN) techniques and wireless personal area network (WPAN) techniques according to a range of recognition. Here, WLAN, which is based on IEEE 802.11, is a technique for accessing a backbone network around a radius of 100 m. In addition, WPAN, which is based on IEEE 802.15, includes Bluetooth, ZigBee, ultra-wideband (UWB), etc.

UWB may denote a short-range, high-speed wireless communication technology using a wide frequency band of several GHz or greater, a low spectral density, and a short pulse width (1 to 4 nanoseconds (nsec)) in a baseband state, or may also directly denote a band to which UWB communication is applied. Hereinafter, a method of providing a ranging-based service between electronic devices by using a UWB communication scheme will be described, but this is only an example, and various wireless communication methods may be applied to the method of providing a ranging-based service of the present disclosure.

Electronic devices according to embodiments of the present disclosure may include a stationary terminal or a mobile terminal, implemented as a computer device, and may communicate with other devices and/or servers by using a wireless or wired communication scheme. For example, the electronic devices may include, but are not limited to, a smart phone, a mobile terminal, a laptop computer, a digital broadcasting terminal, a personal digital assistant (PDA), a portable multimedia player (PMP), a navigation system, and a slate personal computer (PC), a tablet PC, a digital television (TV), a desktop computer, a refrigerator, a projector, a car, a smart car, a digital door lock, a printer, and the like.

Various embodiments of the present disclosure relate to techniques for medium access control (MAC) based on device-to-device (D2D) communication.

D2D communication refers to a method for direct communication between geographically adjacent electronic devices by using no infrastructures such as a base station. Electronic devices may communicate in a one-to-one manner, a one-to-many manner, or a many-to-many manner. In D2D communication, unlicensed frequency bands, such as Wi-Fi Direct, U W B, and Bluetooth, may be used. Alternatively, in D2D communication, licensed frequency bands may be used to improve frequency utilization efficiency of cellular systems. Although D2D communication is restrictively used to refer to machine-to-machine (M2M) communication or machine intelligent communication, in the present disclosure, D2D communication is intended to refer to not only communication between electronic devices having a communication function but also communication between various types of electronic devices having a communication function, such as smart phones or personal computers.

Various embodiments of the present disclosure relate to MAC based on D2D communication described above, and the distance between electronic devices needs to be measured for MAC. In this case, UWB ranging technology may be used to measure the distance between electronic devices. For example, when using a digital key stored in a user terminal to open and close a door of a vehicle (or a front door), the vehicle (or a door lock) may perform secure ranging with the user terminal by using the digital key, and measure the distance between the user terminal and the vehicle (or the door lock) based on a result of the security ranging. The vehicle (or the door lock) may determine opening/closing of the door of the vehicle (or the front door) based on the distance to the user terminal. In the present disclosure, an "access service" that provides various services as electronic devices approach each other may be used in the same meaning as a "ranging-based service" that measures the distance between electronic devices by using ranging technology and provides various services based on the measured distance.

Hereinafter, the present disclosure will be described in detail with reference to the accompanying drawings.

FIG. 1 illustrates a security threat that may occur in providing an access service.

As illustrated in FIG. 1, a legitimate user 10 and a reader device 20 may perform authentication and ranging by using D2D communication. In this case, when an access service providing system operates to guarantee authentication of the legitimate user 10 based on a ranging result value of the legitimate user 10 and the reader device 20 without using a key, there may be a possibility of a security attack. In detail, an attacker 30 may attack a ranging process by recording a signal transmitted from the legitimate user 10 and replaying the signal to the reader device 20. By replaying the recorded signal, the attacker 30 may deceive the reader device 20 into misrecognizing that the legitimate user 10 is within a range in which access authority is granted, and thus obtain the authority to access the reader device 20.

Accordingly, configuring a security protocol based on a pre-shared key may be required to reduce security threats that may occur in providing access services. According to the security protocol based on the pre-shared key, a ranging security level may be improved by exchanging encrypted data by using the pre-shared key.

Each access service provider may have a unique symmetric key-based secure channel generation method to secure security. Thus, a security key used to generate a secure channel is considered a core asset that should not be shared with other entities (e.g., other access service providers, other businesses, or other servers).

To securely provide a mobile device-based access service, a mobile device stores, in a secure component therein (e.g., a secure element or a trusted execution environment (TEE)), important information (e.g., a key to be used to generate a secure channel). The TEE may refer to a secure execution environment provided by a secure area in a processor in which a normal area and the secure area are separated from each other.

A communication scheme using a secure channel is a method for allowing a mobile device to securely access an access service, and it is necessary to generate a fast and secure security session without exposing a key value for protecting a corresponding communication section to the outside.

For example, in order to implement secure ranging using a UWB communication scheme, major UWB parameters including a UWB session key may be exchanged through a Bluetooth-level secure channel.

Figure 2:
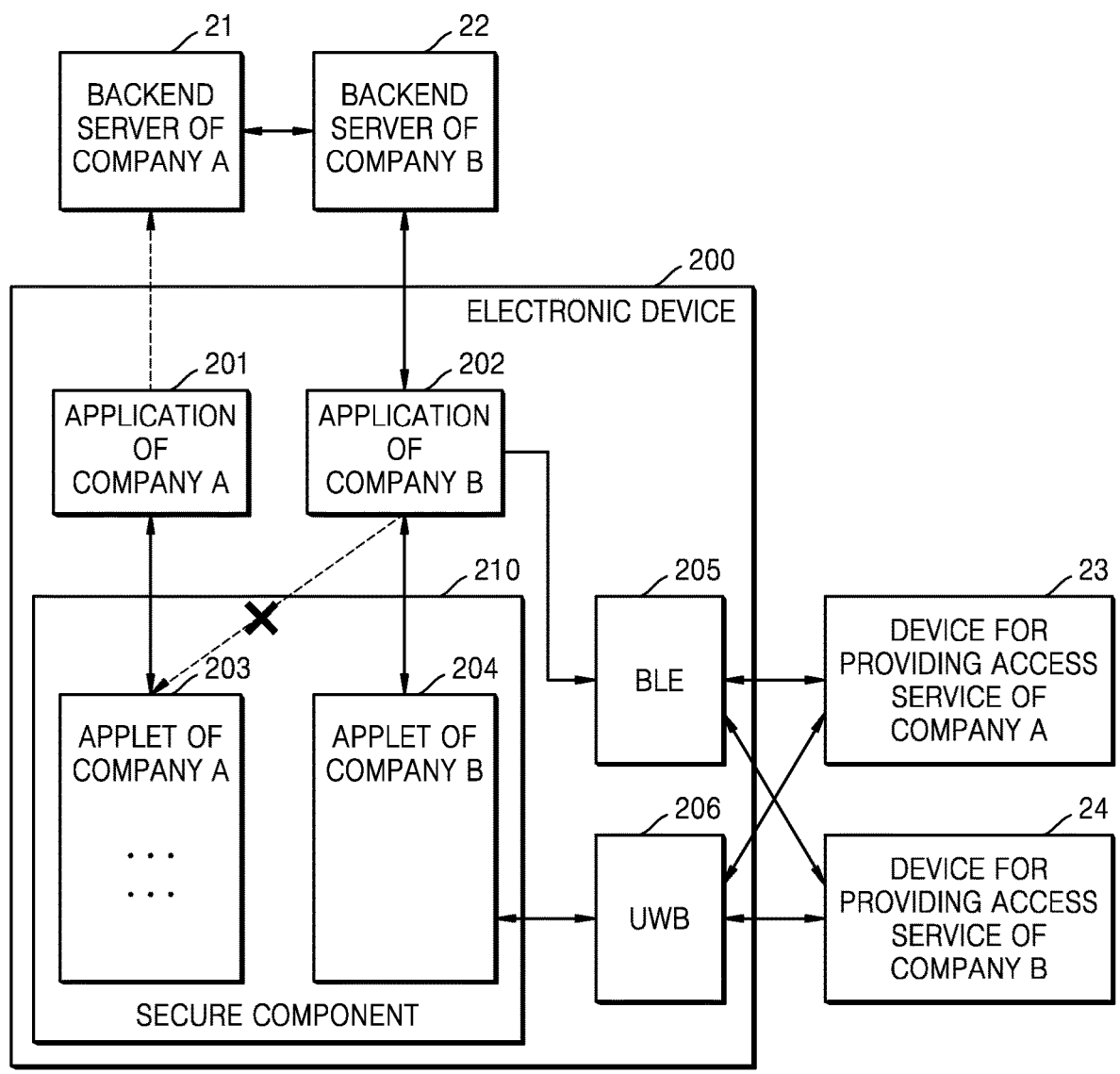
FIG. 2 illustrates a general digital key management system.

FIG. 2 illustrates a general digital key management system.

A backend server 21 of Company A may issue a key and store the key in a secure area 203 in a secure component 210 of a mobile device 200. In this case, only a dedicated application 201 provided by Company A is able to access the secure area 203 in which an applet (or a trusted application (TA)) provided by Company A is installed, and use the stored key.

The secure component 210 of the mobile device 200 may establish, by using the key stored in the secure area 203, a secure channel with a device 23 that provides an access service related to Company A, and perform secure communication through the established secure channel.

Meanwhile, a backend server 22 of Company B may issue a separate key and store the separate key in a separate secure area 204 in the secure component 210 of the mobile device 200. Only a dedicated application 202 provided by Company B is able to access the secure area 204 in which an applet (or a TA) provided by Company B is installed, and use the stored key.

The secure component 210 of the mobile device 200 may establish, by using the key stored in the secure area 204, a secure channel with a device 24 that provides an access service related to Company B, and perform secure communication through the established secure channel.

As illustrated in FIG. 2, an application or applet provided by a conventional access service provider (or a backend server that provides an access service) independently establishes a communication channel with a counterpart device and separately connects to the counterpart device through the communication channel to exchange UWB-related parameters or transmit service-related data. For example, the electronic device 200 may exchange UWB-related parameters or transmit service-related data through a Bluetooth Low Energy (BLE) module 205. Because Company A and Company B manage separate keys by using applets installed in separate secure areas, respectively, the application 202 provided by Company B is unable to access the applet of Company A in the secure area 203 created by the backend server 21 of company A. Therefore, Company A and Company B are able to secure security by using the applets installed in the separate secure areas, respectively. However, in the related art described above, as each access service establishes each secure channel, a delay may occur and data exchange efficiency may be reduced.

The present disclosure may provide a method of securely transmitting at least one of UWB-related parameters or service-related data through a secure channel with a counterpart device established by a common applet in the mobile device 200 (e.g., a FiRa applet according to the standard document defined by the FiRa consortium). In addition, according to various embodiments of the present disclosure, a method is provided in which an access service providing application transmits, to a framework, information about a supported service deployment case and necessary parameters, and the framework supports an access service according to the transmitted information.

Therefore, according to various embodiments of the present disclosure, a plurality of access services are allowed to use a secure channel between two devices in common, and thus a delay required for establishing the secure channel may be reduced and data exchange efficiency may be increased.

The ranging-based service provided in the present disclosure may be implemented according to various embodiments based on a method of using an applet in a secure component and a location in which service application data is stored. According to the first embodiment, a common applet in a secure component may manage all essential data including data related to secure ranging, as well as service application data.

According to the second and third embodiments, a common applet in a secure component may be used to enhance an existing application by using secure ranging through UWB. According to the second and third embodiments, the common applet in the secure component is used to establish a UWB session, but data transaction of the application itself may be performed externally to the common applet. Nevertheless, the common applet may be used to provide a secure channel between two devices. The common applet may be used to provide a secure channel between two devices such that the devices exchange UWB session parameters and a ranging-based service-related transaction is bound to a UWB session.

According to an embodiment, a common applet in a secure component may be used both to establish a UWB session and to support service application data. The common applet according to an embodiment may manage a UWB secure ranging function and maintain service application data. An example of a data model used according to the embodiment is illustrated in FIG. 3.

Figure 3:
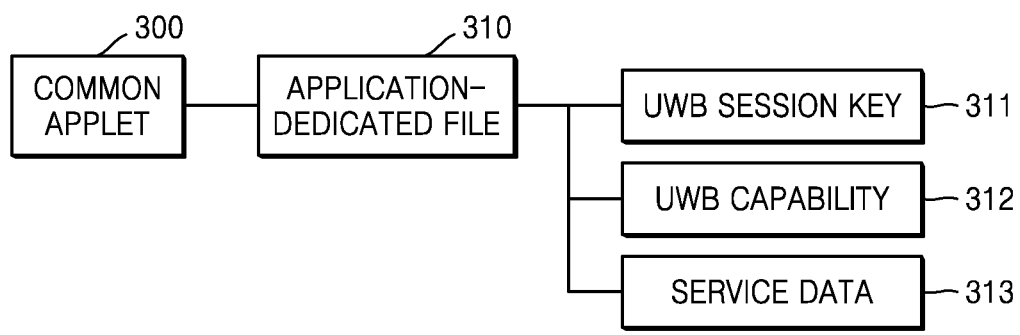
FIG. 3 illustrates an example of a data model stored in an applet installed in a secure component, according to an embodiment.

FIG. 3 illustrates an example of a data model stored in a common applet installed in a secure component, according to an embodiment.

An application-dedicated file (ADF) owned by an access service provider may include service application-specific service data. According to an embodiment, the service data may be stored in a secure component. A reader device may retrieve service data from the secure component when a service transaction occurs. In this case, a tag value indicating the service application-specific service data may be determined according to a ranging-based service-related standard (e.g., a FiRa service standard).

For example, in the case of a physical access control service, service data may be access credentials. Accordingly, the reader device (e.g., a door lock) may retrieve access credentials from an access credential device (e.g., a user terminal), and perform an authentication process with an electronic device, based on the retrieved access credentials.

Figure 4:
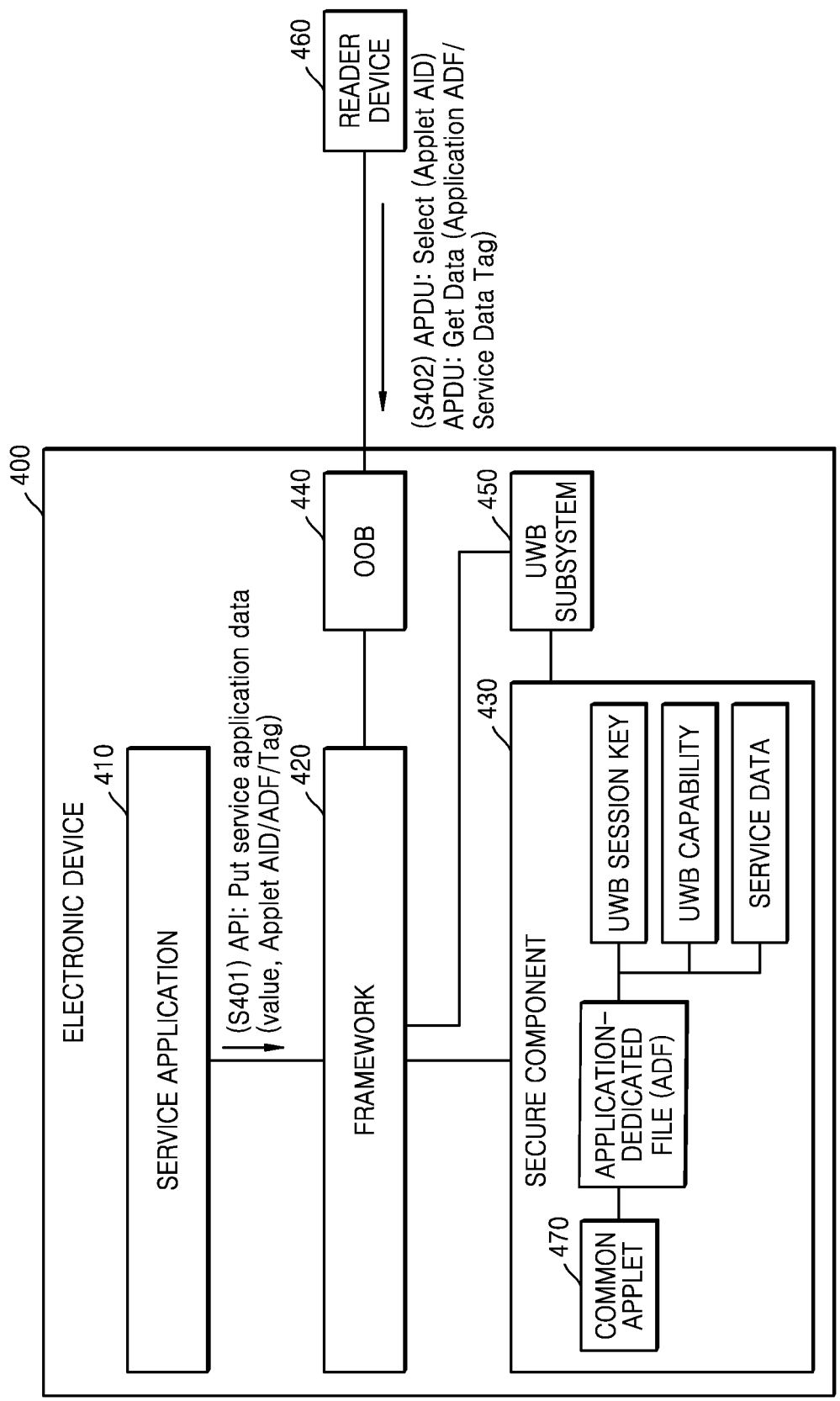
FIG. 4 illustrates an example of ranging-based service processing according to an embodiment.

Hereinafter, a procedure for exchange of ranging-based service-related data of a ranging-based service providing system using the data model illustrated in FIG. 3, according to an embodiment, will be described with reference to FIG. 4. FIG. 4 illustrates an example of ranging-based service processing according to an embodiment.

Before describing the ranging-based service processing according to an embodiment, the structure of the ranging-based service providing system will be described.

First, a service application 410 installed in an electronic device 400 of FIG. 4 is an application that provides a ranging-based service, and may be connected to a UWB subsystem 450 through a framework 420. Also, the service application 410 may use an out-of-band (OOB) module 440 to establish a service-specific OOB connection to a counterpart device. The OOB connection may be used to negotiate configuration information for a ranging session with the counterpart device. For example, the OOB connection may include a connection using a BLE communication scheme, a connection using a near-field communication (NFC) communication scheme, or any other available connection between two devices.

The framework 420 may be an application that supports a ranging-based service. The framework 420 may manage UWB configuration information required to successfully establish a UWB session with the counterpart device, and OOB configuration information, may establish an OOB connection with the counterpart device, may interact with a secure component 430, and may interact with the UWB subsystem 450. For example, the framework 420 may be a system development kit (SDK) installed on an Android operating system.

The framework 420 may provide an application programming interface (API) for an external entity (e.g., an access service providing server, a backend server of a certain company, etc.) to access the secure component 430 through the service application 410, and may provide functions such as access control and command conversion for access to the secure component 430.

The OOB module 440 may be a communication module configured to establish an OOB connection with a reader device 460, and the UWB subsystem 450 may be a communication module configured to perform secure ranging with the reader device 460.

The secure component 430 may be hardware connected to the UWB subsystem 450 in order to transmit, to the UWB subsystem 450, data for UWB ranging.

In the secure component 430 of the electronic device 400 according to an embodiment, a common applet for providing a ranging-based service and managing data related to secure ranging may be installed.

According to an embodiment, an access service provider (or a backend server that provides an access service), may store important information (e.g., an ADF) in a common applet 470 in the secure component 430 through the framework 420. The ADF may include at least one of a UWB session key, UWB capability information, and service data.

The electronic device 400 according to an embodiment may perform secure communication and secure ranging with the reader device 460, based on information included in the ADF stored in the common applet 470. The reader device 460 may be, for example, a device that provides a physical access service, such as a door lock.

The electronic device 400 may use the OOB module 440 to perform secure communication with the reader device 460 through, for example, an NFC, BLE, or other connection scheme. For example, the electronic device 400 may perform mutual authentication with the reader device 460 through the OOB module 440, and, according to the mutual authentication, transmit, to the reader device 460 through the OOB module 440, the UWB session key stored in the common applet 470 or information related to the UWB session key. In addition, the electronic device 400 according to an embodiment may use the UWB session key or the information related to the UWB session key, for UWB secure ranging with the reader device 460. For example, the electronic device 400 may generate a scrambled timestamp sequence (STS) code by using the UWB session key stored in the common applet 470 or the information related to the UWB session key, and perform UWB secure ranging based on the generated STS code. The descriptions of the respective components of the electronic device 400 provided above with reference to FIG. 4 may also be applied to an electronic device 600 of FIG. 6 and an electronic device 700 of FIG. 7, and the descriptions thereof provided above will be omitted.

As illustrated in FIG. 4, according to an embodiment of the present disclosure, the ADF including the service data may be stored in the common applet of the secure component. According to an embodiment, in operation S401, the service application 410 may notify the framework 420 that service application data (i.e., the service data) is maintained in the common applet 470. An API for notifying that the service application data is maintained in the common applet 470 may include at least one of an identifier AID indicating the common applet 470, a service ADF ADF, a tag value of the service application data, and a value of the service application data.

When the electronic device 400 approaches the reader device 460, in operation S402, the reader device 460 may transmit an application data unit (APDU) including the identifier of the common applet 470 (i.e., Select (common applet AID)) in order to select the common applet 470. In addition, the reader device 460 may transmit an APDU including the ADF or a tag value of the service data (i.e., Get Data (Application ADF/Service Data Tag)) in order to retrieve data.

The electronic device 400 may set up a secure channel with the reader device 460 by using information included in the ADF in the common applet 470. The electronic device 400 may identify the service data stored in the common applet 470 based on the service tag value received from the reader device 460, and transmit the service data to the reader device 460 through the established secure channel. Based on the transmitted service data, mutual authentication between the electronic device 400 and the reader device 460 may be performed.

The electronic device 400 may perform mutual authentication and negotiate UWB capability parameters and the UWB session key between the secure component 430 and the reader device 460 through the 00B module 440. After the negotiation, the UWB capability parameters and UWB session key may be maintained in the common applet 470. By using the ADF maintained in the common applet 470, the UWB subsystem 450 may trigger a UWB secure ranging session. The electronic device 400 may generate an STS code by using the UWB session key stored in the common applet 470, and perform UWB secure ranging based on the generated STS code.

For example, according to the embodiment illustrated in FIG. 4, the service application 410 may support the following API.

FiRa Service deployment (1, Tag for service data, value of service data) The service application 410 may transmit the API to the framework 420 to inform the framework 420 to operate according to Deployment case 1, and transmit a tag of service data and a service data value to the framework 420. The API may be transmitted in operation S401 of FIG. 4. However, the embodiment is not limited to the example illustrated in FIG. 4, and the API may be transmitted in various operations depending on an implementation method, such as a key provisioning operation.

Also, the service application 410 may additionally transmit, to the framework 420, the identifier AID of the common applet in which service data is to be stored. The API will be described in more detail below with reference to FIG. 9.

Figure 5:
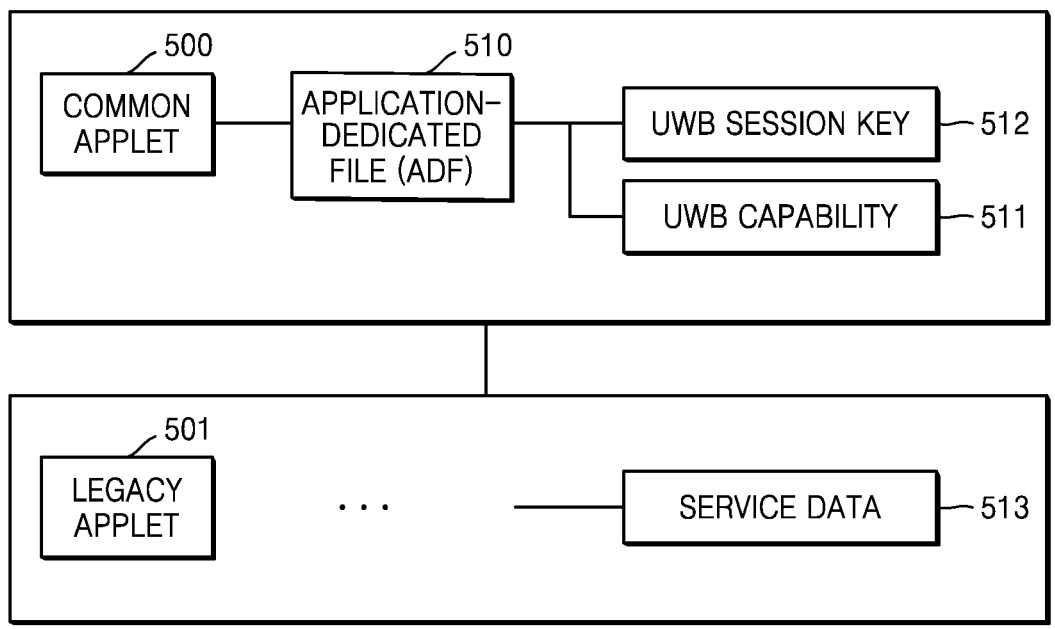
FIG. 5 illustrates an example of a data model stored in an applet installed in a secure component, according to an embodiment.

Meanwhile, according to another embodiment, the common applet in the secure component is used to establish a UWB session, but a data transaction of the application itself may be performed externally to the common applet. FIG. 5 illustrates an example of a data model stored in an applet installed in a secure component, according to an embodiment other than the embodiments illustrated in FIGS. 3 and 4.

As illustrated in FIG. 5, a common applet 500 in a secure component according to an embodiment may maintain an ADF including a UWB session key 512 and UWB capability-related parameters 511 to be used to set up a UWB secure ranging session. The example illustrated in FIG. 5 may differ from the example illustrated in FIG. 3 in that service data 513 is maintained in a legacy applet 501. The service data 513 maintained in the legacy applet 501 may be transmitted through a secure channel established between common applets. The legacy applet 501 may refer to a unique applet provided by each service application, which is different from a common applet newly proposed in the present disclosure.

According to an embodiment, in order to transmit an APDU for the legacy applet 501 to a reader device, APIs FiRa_TUNNEL_REQ (APDU) and FiRa_TUNNEL_RES (APDU) may be processed by a framework, and transmitted and received between the framework and the common applet in the secure component.

Figure 6:
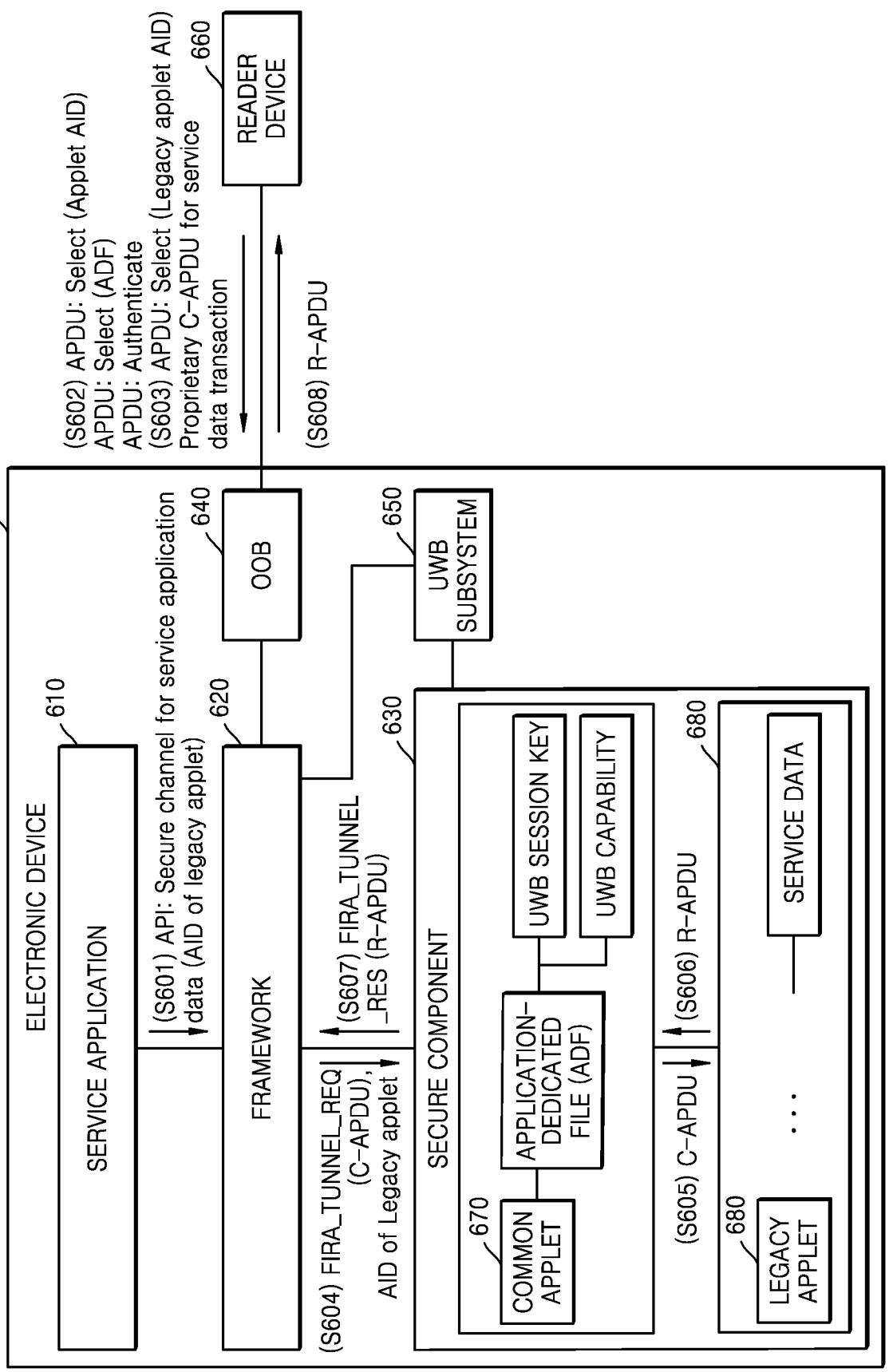
FIG. 6 illustrates an example of ranging-based service processing according to an embodiment.

Hereinafter, a procedure for exchange of ranging-based service-related data using the data model illustrated in FIG. 5, according to an embodiment, will be described with reference to FIG. 6. FIG. 6 illustrates an example of ranging-based service processing according to an embodiment.

The embodiment illustrated in FIG. 6 differs from the embodiment illustrated in FIG. 4 in internal parameters of an API message, which is transmitted from a service application 610 to a framework 620. Also, the embodiments differ in messages transmitted in operations S603, S604, S605, S606, and S607.

First, in operation S601, the service application 610 may inform the framework 620 that service data needs to be transmitted from a legacy applet 680 in a secure component 630 through a secure channel. An API transmitted from the service application 610 to the framework 620 needs to be transmitted together with an AID value of the legacy applet 680.

When the electronic device 600 approaches a reader device 660, in operation S602, in order to select a common applet 670 in the secure component 630, the reader device 660 may transmit an APDU including the identifier of the common applet 670 (i.e. Select (common applet AID)), an APDU for selecting an ADF ADF (i.e. Select (ADF)), and an APDU for mutual authentication. The reader device 660 may set up a secure channel by using an ADF in the common applet 670.

In operation S603, the reader device 660 transmits, to the legacy applet 680 through an 00B module 640, a command APDU (C-APDU) together with an APDU for selecting the legacy applet 680 (i.e., Select (legacy applet AID)).

In operation S604, the framework 620 transmits, to the common applet 670, an APDU command FIRA_TUNNEL_REQ ( ).

In operation S605, the common applet 670 transmits, to the legacy applet 680, the C-APDU received from the framework 620.

In operation S606, the legacy applet 680 transmits, to the common applet 670, a response APDU (R-APDU) to the C-APDU.

In operation S607, the common applet 670 may transmit, to the framework 620, the R-APDU together with service application data by using FIRA_TUNNEL_RES ( ).

In operation S608, the framework 620 transmits the R-APDU to the reader device 660. Based on the service application data transmitted through the R-APDU, mutual authentication between the electronic device 600 and the reader device 660 may be performed.

After UWB capability parameters and a UWB session key are negotiated between the secure component 630 and the reader device 660 through the OOB module 640, the UWB capability parameters and the UWB session key may be maintained in the common applet 670. By using the ADF maintained in the common applet 670, a UWB subsystem 650 may trigger a UWB secure ranging session.

According to the embodiment illustrated in FIG. 6, the service application 610 needs to support the following API. FiRa Service Deployment (2, AID of Legacy Applet)

The service application 610 may transmit the API to the framework 620 to inform the framework 620 to operate according to Deployment case 2, and transmit an identifier AID of the legacy applet 680 to the framework 620. The API may be transmitted in operation S601. However, the embodiment is not limited to the example illustrated in FIG.

6, and the API may be transmitted in various operations depending on an implementation method, such as a key provisioning operation.

Also, the service application 610 may additionally transmit, to the framework 620, the identifier AID of the common applet in which service data is to be stored. The API will be described in more detail below with reference to FIG. 9.

According to the embodiment illustrated in FIG. 6, because the service data is in the legacy applet 680, when the reader device 660 selects the legacy applet 680 and transmits the C-APDU, the framework 620 needs to transmit the APDU to the common applet 670 by using FIRA_TUNNEL_REQ ( ) as described below. The following APIs need to be supported between the framework 620 and the common applet 670.

FIRA_TUNNEL_REQ(APDU)

The role of the API is to transmit an APDU to the legacy applet 680 selected by the reader device 660, through the common applet 670.

FiRa_TUNNEL_RES(APDU)

In addition, the role of the API is to transmit an APDU from the legacy applet 680 to the framework 620 through the common applet 670.

Meanwhile, according to another embodiment, the common applet in the secure component is used to establish a UWB session, but a data transaction of the application itself may be performed externally to the secure component.

Figure 7:
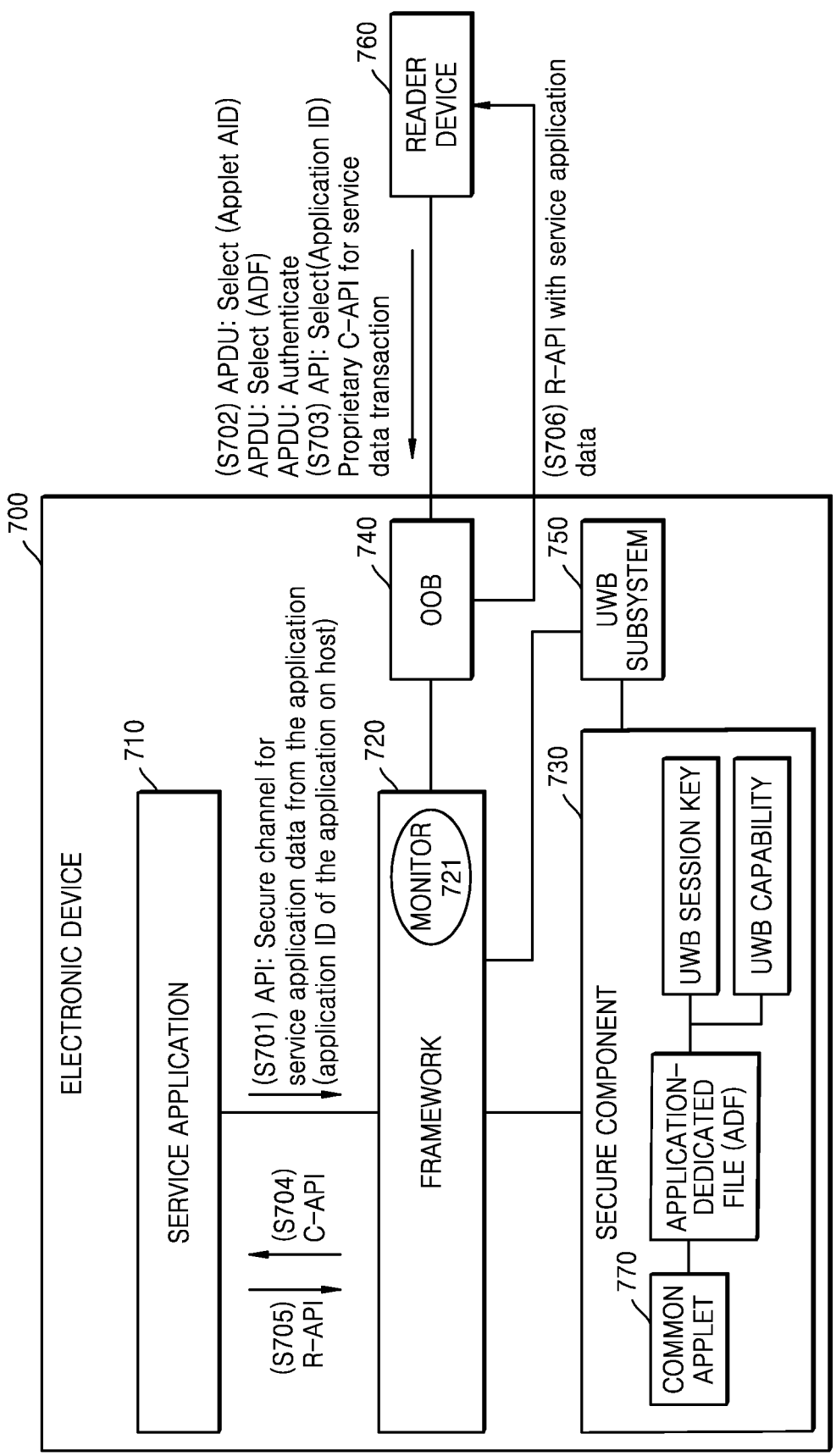
FIG. 7 illustrates an example of ranging-based service processing according to an embodiment.

FIG. 7 illustrates an example of ranging-based service processing according to an embodiment.

As illustrated in FIG. 7, a common applet 770 in a secure component 730 according to an embodiment may maintain a UWB session key and UWB capability-related parameters, and may set up a secure channel. The example illustrated in FIG. 7 differs from the example illustrated in FIG. 6 in that service data is maintained in a service application 710 on a host, rather than in the secure component 730. Accordingly, a secure channel established through the common applet 770 may be used only for transmitting UWB session-related parameters (e.g., a UWB session key, UWB capability parameters, etc.) rather than service data. The service data may be transmitted through an insecure channel.

Several APIs for personalizing a service application may be used to manipulate an ADF in the common applet 770. For example, keys for setting up a secure channel may be inserted into the secure component 730 by the service application 710.

FIG. 7 illustrates a service data transaction process from the service application 710 on a host, which is an application processor.

According to an embodiment, in order to transmit, to a reader device 760, an API for the service application 710, a command API (C-API) in the form of FiRa_TUNNEL_REQ (API) and a response API (R-API) in the form of FiRa_TUNNEL_RES (API) may be processed by a framework 720, and transmitted and received between the service application 710 and the framework 720.

The framework 720 may trigger the beginning of a UWB session when a service application data transaction is successfully completed.

The embodiment illustrated in FIG. 7 differs from the embodiments illustrated in FIGS. 4 and 6 in that a message transmitted from the service application 710 to the framework 720 does not transmit service data, but notifies the framework 720 of only the identifier of the service application 710. A monitor 721 in the framework 720 may continuously monitor whether a message indicating the ID of the service application 710 is transmitted from the reader device 760. When a message indicating the ID of the service application 710 is transmitted from the reader device 760, the framework 720 may transmit a C-API (i.e., a command that targets service data) to the service application 710.

The embodiment illustrated in FIG. 7 differs from the embodiments illustrated in FIGS. 4 and 6 in internal parameters of an API message, which is transmitted from a service application 710 to a framework 720. Also, the embodiments differ in messages transmitted in operations S703, S704, and S705, and the monitor entity 721 is added to the framework 720.

In operation S701, the service application 710 may notify, by using the following API, the framework 720 that the service data is stored in the service application 710.

FiRa Service Deployment (3, AID of FiRa Service Application)

The service application 710 may transmit the API to the framework 720 to inform the framework 720 to operate according to Deployment case 3, and transmit the ID of the service application 710 to the framework 720. The API may be transmitted in operation S701 of FIG. 7. However, the embodiment is not limited to the example illustrated in FIG. 7, and the API may be transmitted in various operations depending on an implementation method, such as a key provisioning operation. The API will be described in more detail below with reference to FIG. 9.

In operation S702, the reader device 760 may transmit, to the electronic device 700, an APDU for establishing a secure channel by using the ADF in the common applet 770 in the secure component 730.

In detail, when the electronic device 700 approaches the reader device 760, in order to select the common applet 770 in the secure component 730, the reader device 760 may transmit an APDU including the identifier of the common applet 770 (i.e. Select (common applet AID)), an APDU for selecting an ADF ADF (i.e. Select (ADF)), and an APDU for mutual authentication.

In operation S703, the reader device 760 transmits, to an OOB module 740 of the electronic device 700, a C-API together with an API for selecting the service application 710 (i.e., Select (application ID)). When the C-API for service application data transaction is transmitted from the reader device 760 to the framework 720 through the OOB module 740, the C-API is transmitted to the service application 710.

After the service application 710 processes the C-API, in operation S705, the service application 710 transmits, to the framework 720, an R-API including a result of the processing. In operation S706, the R-API is transmitted from the framework 720 to the reader device 760 together with the service application data. Based on the transmitted service application data, mutual authentication between the electronic device 700 and the reader device 760 may be performed.

After UWB capability parameters and a UWB session key are negotiated between the secure component 730 and the reader device 760 through the OOB module 740, the UWB capability parameters and the UWB session key are maintained in the common applet 770. By using the ADF maintained in the common applet 770, a UWB subsystem 750 may trigger a UWB secure ranging session.

According to various embodiments of the present disclosure described above, a service application may support at least one of APIs described below, in order to notify of profile information of a framework for the service application. Configuration parameters of the APIs described below needs to be transmitted to a framework that supports the corresponding service. The configuration parameters may include application configuration parameters described in UWB Command Interface (UCI) Generic Specification for UWB session setup (e.g., paragraph 6.2 of UCI Generic Specification). The configuration parameters may further include parameters related to BLE communication.

First, FIG. 8 illustrates an API 810 for setting a service profile and to be transmitted from a service application to a framework, according to an embodiment.

As illustrated in FIG. 8, the API 810 for setting a service profile may include a parameter indicating whether the role of an electronic device is a scanner or an advertiser, and a parameter indicating whether the role of a service to be provided is a server or a client. However, the values of the parameters of the API used according to various embodiments of the present disclosure are not limited to the example illustrated in FIG. 8.

Second, the service application installed on the electronic device may use an API for providing a secure component with a key. The key may be used to establish a secure channel between the secure component of the electronic device and a secure component of a counterpart device.

Third, FIG. 9 illustrates an API for notifying a service deployment method and to be transmitted from a service application to a framework, according to an embodiment.

As illustrated in FIG. 9, an API 910 for notifying a service deployment method may include a parameter indicating a service deployment case, a parameter indicating a service data storage location, and a parameter indicating a service data value.

The parameter indicating a service deployment case may indicate which case of Deployment case 1, Deployment case 2-A, and Deployment case 2-B is used by the service application. In the present disclosure, Deployment case 2-A and Deployment case 2-B may be referred to as Deployment case 2 and Deployment case 3.

Deployment case 1 may be for a case in which a common applet in a secure component is used not only to establish a UWB session but also to support service application data. An operation process according to Deployment case 1 is illustrated in FIG. 4.

Deployment case 2-A may be for a case in which an application (or an applet) in a secure component leverages secure ranging over UWB. For example, in Deployment case 2-A, service application data may be maintained in a legacy applet in a secure component. An operation process according to Deployment case 2-A is illustrated in FIG. 6.

Deployment case 2-B may be for a case in which an application on a host leverages secure ranging over UWB. For example, in Deployment case 2-B, service application data may be maintained in a service application outside a secure component. An operation process according to deployment case 2-B is illustrated in FIG. 7.

When operating in Deployment case 1, the parameter indicating a service data storage location may be an AID of a common applet, an ADF of a service provider of an application, and a tag value of service data. Alternatively, when operating in Deployment case 2-A, the parameter indicating a service data storage location may be an AID of a legacy applet. Alternatively, when operating in Deployment case 2-B, the parameter indicating a service data storage location may be an ID of a service application.

Figure 10:
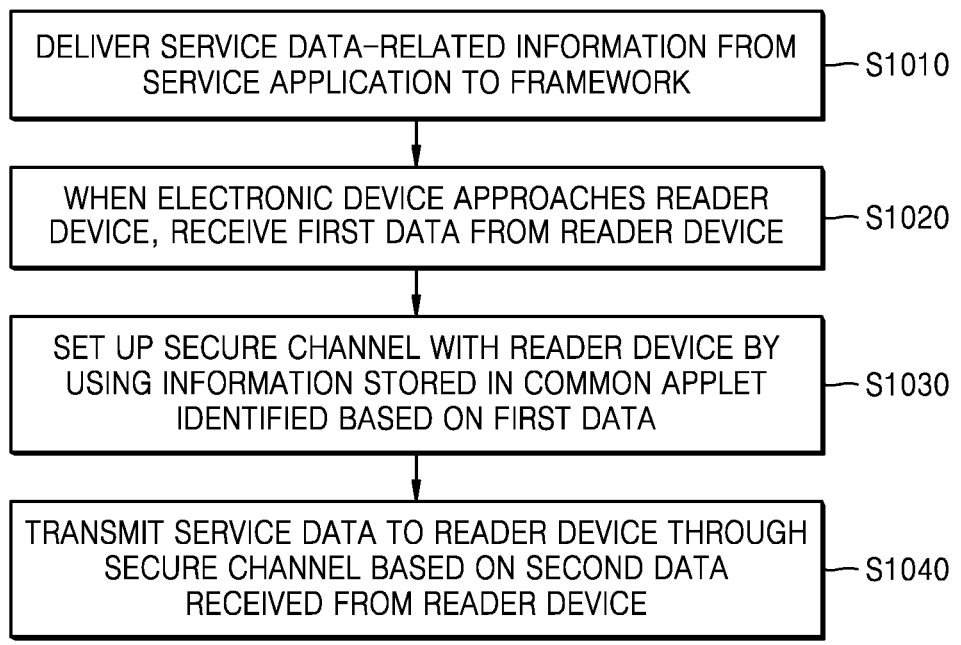
FIG. 10 is a flowchart illustrating a method, performed by an electronic device, of providing a ranging-based service, according to an embodiment.

FIG. 10 is a flowchart illustrating a method, performed by an electronic device, of providing a ranging-based service, according to an embodiment.

In operation S1010, an electronic device according to an embodiment of the present disclosure may transmit service data-related information, from a service application installed in the electronic device to a framework. The service data-related information may include a service deployment case and information about a storage location of service data.

The service deployment case may include at least one of a first case in which service data is stored in a common applet installed in a secure component (i.e., Deployment case 1), a second case in which service data is stored in a legacy applet installed in a secure component (i.e., Deployment case 2-A), and a third case in which service data is stored in a service application (i.e., Deployment case 2-B).

When the service deployment case is the first case, the information about the storage location of the service data may include an identifier of the common applet installed in the secure component. When the service deployment case is the second case, the information about the storage location of the service data may include an identifier of the legacy applet. When the service deployment case is the third case, the information about the storage location of the service data may include an identifier of the service application.

In addition, the electronic device according to an embodiment may further transmit, from the service application to the framework, at least one of service profile configuration information and key information for setting up a secure channel.

In operation S1020, when the electronic device approaches a reader device, the electronic device may receive first data from the reader device. The first data may include an identifier of a common applet installed in the secure component. For example, the electronic device may receive an APDU including an identifier of the common applet (i.e., Select (applet AID)) by using an NFC or BLE communication scheme.

In operation S1030, the electronic device according to an embodiment of the present disclosure may set up a secure channel with the reader device by using information stored in the common applet identified based on the first data. The common applet may be an applet installed in the secure component of the electronic device and to be used by a plurality of service applications for secure channel setup.

Information stored in the common applet used for secure channel setup may be an ADF including parameters used for UWB ranging (e.g., UWB capability parameters) and a session key.

In operation S1040, the electronic device according to an embodiment of the present disclosure may transmit the service data to the reader device through the secure channel (or an insecure channel) based on second data received from the reader device. For example, the electronic device may transmit the service data to the reader device by using an NFC or BLE communication scheme.

When the service deployment case is the first case (i.e., the case in which the service data is stored in the common applet in the secure component), the second data may include a tag value of the service data. The electronic device may identify, from the common applet, an ADF corresponding to the tag value, based on the tag value received from the reader device, and set up the secure channel with the reader device by using the identified ADF. In this case, the service data may be transmitted to the reader device through the secure channel set up by the common applet.

When the service deployment case is the second case (i.e., the case in which the service data is stored in the legacy applet in the secure component), the second data may include an identifier of the legacy applet. The electronic device may receive, from the reader device, a C-APDU together with the identifier of the legacy applet, and transmit the C-APDU from the framework to the legacy applet via the common applet in the secure component. In response to the C-APDU, the secure component of the electronic device may transmit an R-APDU from the legacy applet to the framework via the common applet. The electronic device may transmit, to the reader device, the R-APDU including the service data. In this case, the service data may be transmitted to the reader device through the secure channel set up by the common applet.

When the service deployment case is the third case (i.e., the case in which the service data is stored in a service application outside the secure component), the second data may include an identifier of the service application. The electronic device may receive, from the reader device, a C-API together with the identifier of the service application, and transmit the C-API from the framework to the service application. In response to the C-API, the service application of the electronic device may transmit an R-API to the framework. The electronic device may transmit, to the reader device, an R-API including the service data. In this case, the service data is located outside the secure component, and thus may be transmitted to the reader device through a channel other than the secure channel set up by the secure component.

Based on service application data transmitted from the electronic device to the reader device, mutual authentication between the electronic device and the reader device may be performed. After UWB capability parameters and a UWB session key are negotiated through the secure channel, the electronic device maintains, in the common applet, an ADF including the UWB capability parameters and the UWB session key. The electronic device may trigger a UWB secure ranging session by using the ADF maintained in the common applet.

The electronic device may perform ranging by transmitting and receiving a ranging frame including an STS code generated by using the session key included in the ADF in the common applet, to and from the reader device in a UWB communication scheme.

Figure 11:
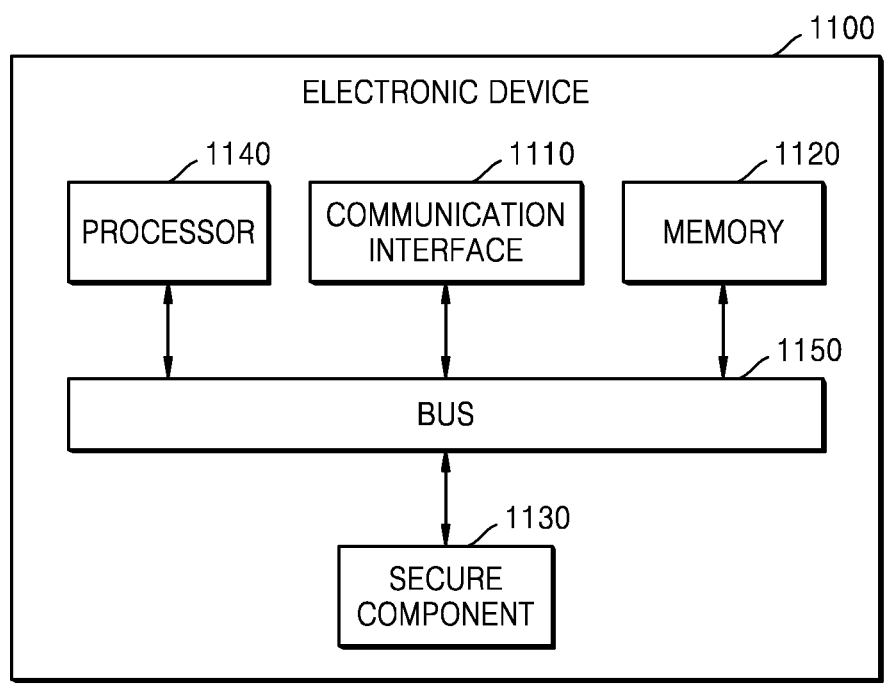
FIG. 11 illustrates a block diagram of an electronic device according to an embodiment.

FIG. 11 illustrates a block diagram of an electronic device according to an embodiment.

An electronic device 1100 according to an embodiment of the present disclosure may include a personalized mobile device, but is not limited thereto, and may include various types of electronic devices. For example, the electronic device 1100 may include a smart phone, a tablet PC, a PC, a camera, a wearable device, etc.

Referring to FIG. 11, the electronic device 1100 may include a communication interface 1110, a memory 1120, a secure component 1130, a processor 1140, and a bus 1150 connecting the components to each other.

The communication interface 1110 may perform wired/wireless communication with another device (e.g., an access service providing server or a reader device) or a network. To this end, the communication interface 1110 may include a communication module that supports at least one of various wired/wireless communication methods. For example, the communication module may be in the form of a chipset, or may be a sticker/barcode (e.g., a sticker including an NFC tag) including information necessary for communication.

The wireless communication may include, for example, at least one of cellular communication, Wi-Fi (Wireless Fidelity), Wi-Fi Direct, Bluetooth, BLE, UWB, or NFC. The wired communication may include, for example, at least one of Universal Serial Bus (USB) or High-Definition Multimedia Interface (HDMI).

In an embodiment, the communication interface 1110 may include a communication module for short-range communication. For example, the communication interface 1110 may include a communication module for performing various types of short-range communication, such as infrared communication or magnetic secure transmission (MST), in addition to Wi-Fi, Wi-Fi Direct, Bluetooth, BLE, UWB, and NFC described above.

Various types of data, such as programs (e.g., applications, etc.) or files, may be installed and stored in the memory 1120. The processor 1140 may access and use data stored in the memory 1120, or may store new data in the memory 1120. In an embodiment, a program (e.g., a service application, a framework) and data for managing a digital key may be installed and stored in the memory 1120.

For example, the memory 1120 may include at least one of a flash memory-type storage medium, a hard disk-type storage medium, a multimedia card micro-type storage medium, a card-type memory (e.g., SD or XD memory), random-access memory (RAM), static RAM (SRAM), read-only memory (ROM), electrically erasable programmable ROM (EEPROM), programmable ROM (PROM), magnetic memory, a magnetic disk, and an optical disc.

The electronic device 1100 according to an embodiment may include the secure component 1130, and the secure component 1130 may perform processing, such as generation, deletion, or management of major parameters including a digital key for controlling or accessing an external device, and may perform authentication on the digital key. Furthermore, the secure component may provide a function of securely managing the digital key by authenticating access to the digital key by an external entity, such as a service provider server or a reader device, and verifying its authority. For example, the secure component may include a secure element (SE) and/or a TEE.

The secure component 1130 is an independent secure storage device of the electronic device 1100, and is accessible by only an authorized application. The secure component 1130 may be physically isolated from other hardware components. According to an embodiment, a program and data (e.g., a secure domain, an applet, etc.) for managing an ADF may be installed and stored in the secure component 1130.

The processor 1140 controls the overall operation of the electronic device 1100, and may include at least one processor, such as a central processing unit (CPU) or a GPU (graphics processing unit). The processor 1140 may control other components included in the electronic device 1100 to perform an operation for a ranging-based service. For example, the processor 1140 may execute a program stored in the memory 1120 and the secure component 1130, load a file stored therein, or store a new file therein.

The processor 1140 according to an embodiment may transmit service data-related information, from a service application installed in the electronic device to a framework. The service data-related information may be an API for notifying a service deployment method including a service deployment case and information about a storage location of service data.

The service deployment case may include at least one of a first case in which the service data is stored in a common applet installed in the secure component, a second case in which the service data is stored in a legacy applet installed in the secure component, and a third case in which the service data is stored in a service application.

When the service deployment case is the first case, the information about the storage location of the service data may include an identifier of the common applet installed in the secure component. When the service deployment case is the second case, the information about the storage location of the service data may include an identifier of the legacy applet. When the service deployment case is the third case, the information about the storage location of the service data may include an identifier of the service application.

In addition to the API for notifying a service deployment method, the processor 1140 according to an embodiment may further transmit, from the service application to the framework, at least one of a service profile configuration API and a key provision API for setting up a secure channel.

The processor 1140 according to an embodiment may receive first data from the reader device when the electronic device 1100 approaches the reader device. The first data may include an identifier of a common applet installed in the secure component. For example, the electronic device 1100 may receive an APDU including an identifier of the common applet by using an NFC module or a BLE module included in the communication interface 1110.

The processor 1140 according to an embodiment may transmit the first data to the secure component 1130. The secure component 1130 may identify the common applet based on the first data, and set up a secure channel with the reader device by using information stored in the identified common applet. The common applet may be an applet commonly used by a plurality of service applications of the electronic device for secure channel setup.

Information stored in the common applet and to be used for secure channel setup may be an ADF including parameters used for UWB ranging, and a session key.

The processor 1140 according to an embodiment may transmit service data to the reader device based on second data received from the reader device. For example, the processor 1140 may transmit the service data to the reader device by using an NFC communication module or a BLE communication module of the communication interface 1110.

When the service deployment case is the first case, the processor 1140 may receive a tag value of the service data as the second data from the reader device. The secure component 1130 of the electronic device 1100 may identify the ADF in the common applet based on the tag value received from the reader device, and use the identified ADF to set up a secure channel with the reader device.

When the service deployment case is the second case, the processor 1140 may receive an identifier of the legacy applet as second data from the reader device. The processor 1140 may receive a command APDU together with the identifier of the legacy applet from the reader device. The framework of the processor 1140 may transmit a C-APDU to the legacy applet through the common applet in the secure component 1130. In response to the C-APDU, the secure component 1130 may transmit an R-APDU from the legacy applet to the framework through the common applet. The framework of the processor 1140 may transmit the R-APDU including the service data to the reader device.

When the service deployment case is the third case, the processor 1140 may receive an identifier of the service application as the second data from the reader device. The framework of the processor 1140 may receive, from the reader device, a C-API together with the identifier of the service application, and transmit the C-API from the framework to the service application. In response to the C-API, the service application may transmit an R-API to the framework. The framework of the processor 1140 may transmit an R-API including the service data to the reader device.

Based on service application data transmitted from the electronic device 1100 to the reader device, mutual authentication between the electronic device 1100 and the reader device may be performed. After negotiating UWB capability parameters and a UWB session key through the secure channel, the electronic device 1100 maintains, in the common applet in the secure component 1130, an ADF including the UWB capability parameters and the UWB session key. The electronic device 1100 may establish a UWB secure ranging session by using the ADF maintained in the secure component 1130. The UWB communication module of the communication interface 1110 of the electronic device 1100 according to an embodiment may perform ranging with the reader device by generating an STS code by using the UWB session key included in the ADF maintained in the common applet, and transmitting and receiving a ranging frame including the generated STS code.

The bus 1150 is a common data transmission channel connecting the communication interface 1110, the memory 1120, the secure component 1130, and the processor 1140 to each other.

Figure 12:
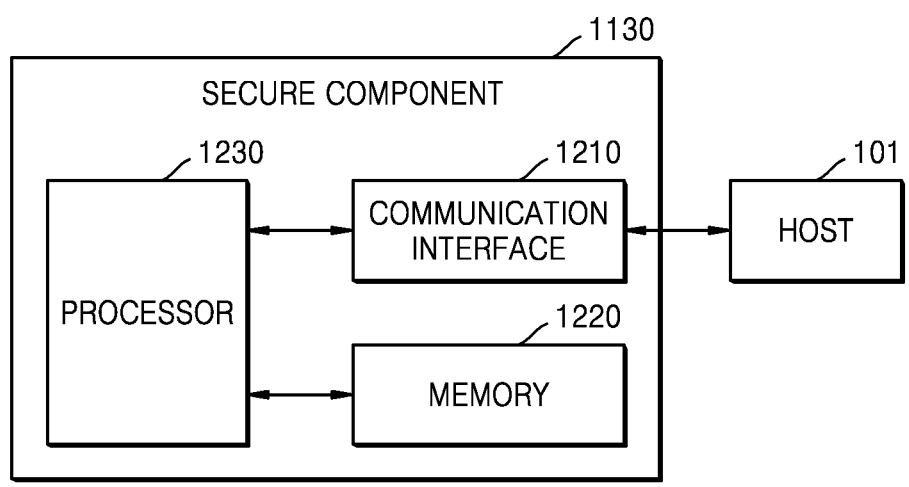
FIG. 12 illustrates a block diagram of a secure component according to an embodiment.

FIG. 12 illustrates a block diagram of the secure component 1130 according to an embodiment of the present disclosure.

Referring to FIG. 12, the secure component 1130 may include a communication interface 1210, a memory 1220, and a processor 1230.

The secure component 1130 according to an embodiment is an independent secure storage device of the electronic device 1100, and is accessible by only an authorized application. For example, the secure component 1130 may include a TEE, an embedded SE (eSE), universal integrated circuit card (UICC), a Secure Digital (SD) card, an embedded UICC (eUICC), or a separate security processing unit (SPU) that is a combination of hardware and software or that employs a hardware method.

The communication interface 1210 may communicate with a host 101 or another device (e.g., an access service providing server or a reader device, etc.). To this end, the communication interface 1210 may include a communication module that supports at least one of various wired/wireless communication methods. Here, the host 101 may be one of devices included in the electronic device 1100, and may include, for example, an application processor (AP), a memory, and the like. The communication interface 1210 may be a serial interface such as International Organization for Standardization (ISO) 7816, USB, Inter-Integrated Circuit (I2C), Serial Peripheral Interface (SPI), or Single Wire Protocol (SWP), or any serial interface generally used for communication between two hardware devices. In addition, the communication interface 1210 may be a wireless interface, such as ISO 14443, Zigbee, or Bluetooth, that directly connects an antenna to a hardware device. Furthermore, the communication interface 1210 may be a parallel interface connected to a central bus of the electronic device 1100, and, in this case, may include a buffer to receive commands and data from the host 101.

Various types of data, such as programs (e.g., an applet) or files, may be installed and stored in the memory 1220. The processor 1230 may access and use data stored in the memory 1220, or may store new data in the memory 1220. In an embodiment, a program and data for processing a digital key may be installed and stored in the memory 1220. The memory 1220 may be a nonvolatile memory device.

The processor 1230 controls the overall operation of the secure component 1130, and may include at least one processor such as a CPU or a GPU. The processor 1230 may control other components included in the secure component 1130 to perform an operation for managing an ADF. For example, the processor 1230 may execute a program stored in the memory 1220, load a file stored therein, or store a new file therein. In an embodiment, the processor 1230 may perform an operation for managing an ADF by executing a program stored in the memory 1220.

Although not illustrated in FIG. 11, the electronic device 1100 including the secure component 1130 according to an embodiment may further include a framework. The framework is a service application that serves as a gateway upon an external entity accessing the secure component 1130. The framework may provide an API for an external entity to access the secure component 1130, and may provide functions, such as access control and command conversion for accessing the secure component 1130. The external entity may be, for example, a secure area issuer, a service provider, a reader device, and/or an access service providing device.

A lightweight application (e.g., an applet or a TA) may be installed and executed in the secure component 1130 according to an embodiment. The applet may store an ADF in the secure component 1130 and provide services, such as using, deleting, and managing the stored ADF. The applet may be pre-installed in the secure component 1130, or may be loaded or installed therein later as needed.

The embodiments of the present disclosure may be implemented as a software (S/W) program including instructions stored in a computer-readable storage medium.

A computer may invoke stored instructions from the storage medium and operate according to an embodiment of the present disclosure based on the invoked instructions, and may include an electronic device according to the embodiments of the present disclosure.

The computer-readable storage medium may be provided in the form of a non-transitory storage medium. Here, the term 'non-transitory' simply means that the storage medium is a tangible device, and does not include a signal, but this term does not differentiate between where data is semi-permanently stored in the storage medium and where the data is temporarily stored in the storage medium. For example, the non-transitory storage medium may include a buffer in which data is temporarily stored.

In addition, an electronic device or a method according to the embodiments of the present disclosure may be provided in a computer program product. The computer program product may be traded between a seller and a purchaser as a commodity.

The computer program product may include a S/W program and a computer-readable recording medium storing the S/W program. For example, the computer program product may include a product in the form of an S/W program electronically distributed (e.g., a downloadable application) through a manufacturer of an electronic device or an electronic market (e.g., Google Play Store, App Store). For electronic distribution, at least part of the S/W program may be stored in a storage medium or temporarily generated. In this case, the storage medium may be a storage medium of a server of the manufacturer or a server of the electronic market, or a relay server that temporarily stores the S/W program.

The computer program product may include a storage medium of a server or a storage medium of a terminal, in a system consisting of the server and the terminal. Alternatively, when there is a third device (e.g., a smart phone) communicatively connected to the server or the terminal, the computer program product may include a storage medium of the third device. Alternatively, the computer program product may include the S/W program itself transmitted from the server to the terminal or the third device, or transmitted from the third device to the terminal.

In this case, one of the server, the terminal, and the third device may execute the computer program product to perform the method according to the embodiments disclosed herein. Alternatively, two or more of the server, the terminal, and the third device may execute the computer program product to execute the method according to the embodiments disclosed herein in a distributed manner.

For example, the server (e.g., a cloud server, an artificial intelligence server) may execute the computer program product stored in the server to control the terminal communicatively connected to the server to perform the method according to the embodiments disclosed herein.

As another example, the third device may execute the computer program product to control the terminal communicatively connected to the third device to perform the method according to the embodiments disclosed herein.

When the third device executes the computer program product, the third device may download the computer program product from the server, and execute the downloaded computer program product. Alternatively, the third device may execute the computer program product provided in a preloaded state, and perform the method according to the embodiments disclosed herein.

The invention claimed is:

1. A method, performed by an electronic device in a wireless communication system, the method comprising:
   identifying a service deployment case, from among a plurality of service deployment cases related to storage locations of service data;
   establishing a secure channel with a reader device, based on a common applet installed in a secure component of the electronic device, wherein the common applet is related to multiple service providers;
   receiving, from the reader device, information for accessing the service data, wherein the information for accessing the service data corresponds to the identified service deployment case; and
   transmitting, to the reader device, the service data, based on the information for accessing the service data.

2. The method of claim 1, wherein the plurality of service deployment cases include:
   a first case in which the service data is stored in the common applet installed;
   a second case in which the service data is stored in an applet different from the common applet and installed in the secure component; and
   a third case in which the service data is stored in a service application installed in the electronic device.

3. The method of claim 1, wherein the service deployment case is indicated by service profile configuration information notified by a service application to a framework.

4. The method of claim 1, wherein the common applet includes ultra-wideband (UWB) ranging related information.

5. The method of claim 2, wherein, in case that the service deployment case is the first case, the information for accessing the service data includes a tag value of the service data.

6. The method of claim 2, wherein, in case that the service deployment case is the second case, the information for accessing the service data includes an identifier of the applet.

7. The method of claim 2, wherein, in case that the service deployment case is the third case, the information for accessing the service data is related to the service application.

8. The method of claim 2, wherein, in case that the service deployment case is the second case;
receiving the information for accessing the service data from the reader device comprises
receiving, from the reader device, a command application data unit (APDU) with an identifier of the applet, wherein the command APDU is transmitted from the common applet to the applet, and a response APDU is transmitted from the applet to the common applet, and
transmitting the service data to the reader device comprises transmitting, to the reader device, the response APDU including the service data.

9. The method of claim 4, further comprising performing ranging, based on the UWB ranging related information.

10. The method of claim 7, further comprising retrieving the service data from the service application, based on the information for accessing the service data.

11. An electronic device in a wireless communication system, the electronic device comprising:
a transceiver; and
at least one processor coupled with the transceiver and configured to:
identify a service deployment case from among a plurality of service deployment cases related to storage locations of service data,
establish a secure channel with a reader device, based on a common applet installed in a secure component of the electronic device, wherein the common applet is related to multiple service providers,
receive, from the reader device, via the transceiver, information for accessing the service data, wherein the information for accessing the service data corresponds to the identified service deployment case, and
transmit, to the reader device, via the transceiver, the service data, based on the information for accessing the service data.

12. The electronic device of claim 11, wherein, in case that the service deployment case is a first case in which the service data is stored in the common applet, the information for accessing the service data includes a tag value of the service data.

13. The electronic device of claim 11, wherein, in case that the service deployment case is a second case in which the service data is stored in an applet different from the common applet and installed in the secure component, the information for accessing the service data includes an identifier of the applet.

14. The electronic device of claim 11, wherein, in case that the service deployment case is a third case in which the service data is stored in a service application installed in the electronic device, the information for accessing the service data includes an identifier of the service application.

15. One or more computer-readable recording media having recorded thereon a program for executing a method, performed by an electronic device in a wireless communication system, the method comprising:
identifying a service deployment case from among a plurality of service deployment cases related to storage locations of service data;
establishing a secure channel with a reader device, based on a common applet installed in a secure component of the electronic device, wherein the common applet is related to multiple service providers;
receiving, from the reader device, information for accessing the service data, wherein the information for accessing the service data corresponds to the identified service deployment case; and
transmitting, to the reader device, the service data, based on the information for accessing the service data.

\* \* \* \* \*